US007147079B2

United States Patent
Brun et al.

(10) Patent No.: US 7,147,079 B2
(45) Date of Patent: Dec. 12, 2006

(54) DEVICE TO PREVENT THE FORMATION OF SOLID MATTER DUE TO PROJECTIONS ON AN AIR OUTLET

(75) Inventors: Michel Brun, Maurepas (FR); Sylvain Carlier, Guyancourt (FR); Antoine Saunier, Versailles (FR)

(73) Assignee: Giat Industries, Versailles (FR)

( * ) Notice: Subject to any disclaimer, the term of this patent is extended or adjusted under 35 U.S.C. 154(b) by 250 days.

(21) Appl. No.: 10/742,391

(22) Filed: Dec. 22, 2003

(65) Prior Publication Data

US 2004/0134706 A1    Jul. 15, 2004

(30) Foreign Application Priority Data

Dec. 23, 2002   (FR)   .................................. 02 16488

(51) Int. Cl.
*B60K 13/04*   (2006.01)
(52) U.S. Cl. ..................... 180/309; 165/84; 55/282
(58) Field of Classification Search ............. 180/309, 180/296; 165/84, 152, 122; 55/300, 282
See application file for complete search history.

(56) References Cited

U.S. PATENT DOCUMENTS

| 4,276,056 A | * | 6/1981 | Pasic et al. ..................... 95/76 |
| 5,558,156 A | * | 9/1996 | Tsutsui ......................... 165/84 |
| 6,202,765 B1 | * | 3/2001 | Schaffer et al. ............. 175/207 |
| 6,907,919 B1 | * | 6/2005 | Zhang ..................... 165/109.1 |
| 6,918,432 B1 | * | 7/2005 | Ozaki ......................... 165/152 |

FOREIGN PATENT DOCUMENTS

| DE | 32 21 378 A1 | 12/1983 |
| DE | 39 03 361 A1 | 8/1990 |
| EP | 0 985 874 A2 | 3/2000 |
| SE | 2025563 A * | 1/1980 |

* cited by examiner

*Primary Examiner*—J. Allen Shriver
(74) *Attorney, Agent, or Firm*—Steptoe & Johnson LLP

(57) ABSTRACT

The invention relates to a device to prevent the formation of solid matter due to projections on an air outlet, for example that of an armored vehicle, located near to such projections.

It comprises a shutter 1 incorporating at least two vibrating fins 3 fixed onto a support 2, said fins being of two different types mounted alternatively and vibrating differently. One vibrating fin 3a is connected to the support by a number N of fastenings and the other vibrating fin 3b by a number N+/−1 fastenings. The support 2 for the vibrating fins is constituted by an assembly of bars 2a, 2b that are substantially perpendicular to the fins 3. Abutments 5 are placed on the fins 3 or on the support 2.

22 Claims, 1 Drawing Sheet

DEVICE TO PREVENT THE FORMATION OF SOLID MATTER DUE TO PROJECTIONS ON AN AIR OUTLET

BACKGROUND OF THE INVENTION

1. Field of the Invention

The technical scope of the invention is that of devices allowing flow outlets to be protected from the formation of a solid matter due to projections that may be cast onto them.

2. Description of the Related Art

Air outlets, in particular on a vehicle, are more often than not of a simple form, that is to say fitted with vents. These air outlets are generally near to materials of all types that are projected onto the vents and build up. After a while, these vents are completely blocked thus considerably hindering the air outlet process. They therefore have to be cleaned by hand, which is often difficult if not impossible. Moreover, if this built-up material dries, cleaning by hand becomes extremely difficult.

SUMMARY OF THE INVENTION

The aim of the invention is thus to overcome such drawbacks by allowing the air outlets to be positioned, on vehicle for example, in places exposed to projections, whilst avoiding build-up of material.

The invention thus relates to a device to prevent the formation of solid matter due to projections on an air outlet, for example that of an armored vehicle, located near to such projections, wherein it comprises a shutter comprising at least two vibrating fins fixed onto a support, said fins being of two different types mounted alternatively and vibrating differently.

According to one characteristic of the device, one of said vibrating fins is connected to the support by a number N of fastenings and the other one of said vibrating fins by a number N+/−1 fastenings.

According to another characteristic of the device, the support for the vibrating fins is constituted by an assembly of bars that are substantially perpendicular to the axial direction of the fins.

According to yet another characteristic of the device, it incorporates abutments limiting the possibility of transverse displacement so as to eliminate impacts between the fins and the support thereby also eliminating shocks.

According to another characteristic of the device, the abutments are arranged on the fins or on the support.

According to yet another characteristic of the device, the abutments are made either partly or totally of a non-metallic material.

According to yet another characteristic of the device, the vibration of the fins is caused by the shocks, shaking or vibrations to which the outlet is subjected.

According to yet another characteristic of the device, the movement of the fins is caused by a line of electromagnets placed near to the vibration nodes of the fins, whose frequency is adapted to the two types of fins and whose phase shifting causes the two types of fins to vibrate in opposition or in quadrature.

According to yet another characteristic of the device, the fin support is of greater rigidity than the fins.

According to yet another characteristic of the device, the fins are of a thickness giving a rigidity such that their vibrations are not noticeably damped in the presence of projections.

According to yet another characteristic of the device, the shutter comprises upstream airflow deflectors fitted with a curved part able to orient the flow towards each of the fins.

A first advantage of the device according to the invention lies in that it prevents the formation of solid matter due to projections, for example of mud, onto the air outlet by causing such matter to be eliminated.

Another advantage of the invention lies in the fact that the projections cast on the fins are cast off before they build up.

Yet another advantage of the device according to the invention lies in that it allows air or gas outlets to be provided on an armored vehicle without compromising its infrared invisibility. In fact, the hot air outlets may in this case be placed under the vehicle in a suitable place thus making it difficult or even impossible for the heat source to be detected.

Yet another advantage of the invention lies in its simple design and in the ease with which a fin may be replaced in case of fracture.

BRIEF DESCRIPTION OF THE DRAWINGS

Other characteristics, particulars and advantages of the invention will become apparent from the following description of particular embodiments, such description being given by way of illustration and in reference to the appended drawings, in which.

DETAILED DESCRIPTION OF PREFERRED EMBODIMENTS

Figure 1:
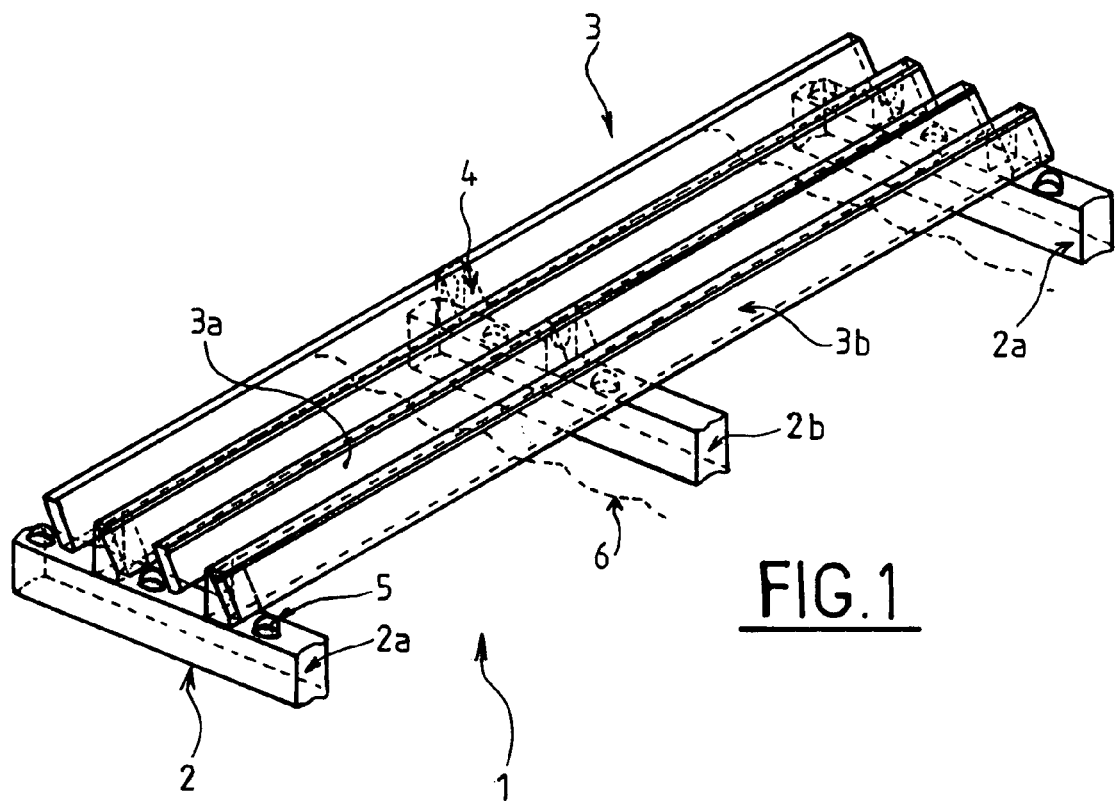
FIG. 1 shows a view of an air outlet according to the invention.

FIG. 1 shows a shutter 1 constituted by a support 2 and fins 3. The shutter is fixed to the mouth of an air duct not shown, further details of which are not necessary. The fins are in the form of an elongated plate, for example rectangular, placed obliquely with respect to the support.

Since the fins must vibrate, they cannot have a curve perpendicular to their axis and must be in a plane.

The drawing shows three bars 2 to fasten the vibrating fins, two end bars 2a and one central 2b bar. Intermediate fastening parts 4 for the fins 3 are shown on the bars 2. These intermediate fastening parts must ensure flexible fastening allowing the fins to vibrate, as well as an inclined position for the fins with respect to the plane of the air outlet. The fins may be fastened to these parts by welding, screwing, bolting or any other known process (multi-riveting, latching, pinching, pinning, etc.).

In the example shown, the shutter is fitted with two types of vibrating fins, fin 3a only being fastened to the central bar 2b and fin 3b being fastened to the two side bars 2a. Abutments 5 complete the retention means for the fins on those bars having no fastening elements. These abutments 5 limit the vibratory movement of the fins and thus avoid shocks between fins or between fins and bars.

The abutments 5 may be elongated elements, or not, fastened between two fins which, during their vibration, strike the abutments thereby being stopped and prevented from striking each other or the support, any such shocks being able to cause mechanical deterioration and unwanted noise. The abutments are advantageously made of a non-metallic material, for example plastic, which absorbed the vibrations and the shocks without damaging the fins.

Dotted lines represent lines of electromagnets 6, which may, in another configuration, impart movement to the fins.

From the drawing, it is apparent that either the shocks to which the shutter is subjected, or the lines of electromagnets 6 impart movement to the fins 3. Both types of fins, 3a and 3b, vibrate differently, in opposition or in quadrature, thereby preventing the formation of solid matter on the shutter 1.

The different vibrations of the two types of fin are due to the alternate installation of their fastenings, and possibly as well as the choice of their thickness. The alternate fastenings cause a shift between the parts of the fins free to vibrate and those that are fixed. Using fins of different thicknesses, despite the differences in fastening, allows relatively similar vibration frequencies and amplitudes to be obtained, excited by a same stimulus, either mechanical or electromagnetic.

The abutments 5 may be made either partly or totally of a non-metallic material so as to avoid shocks of metal against metal, which could damage the fins 3.

Figure 2:
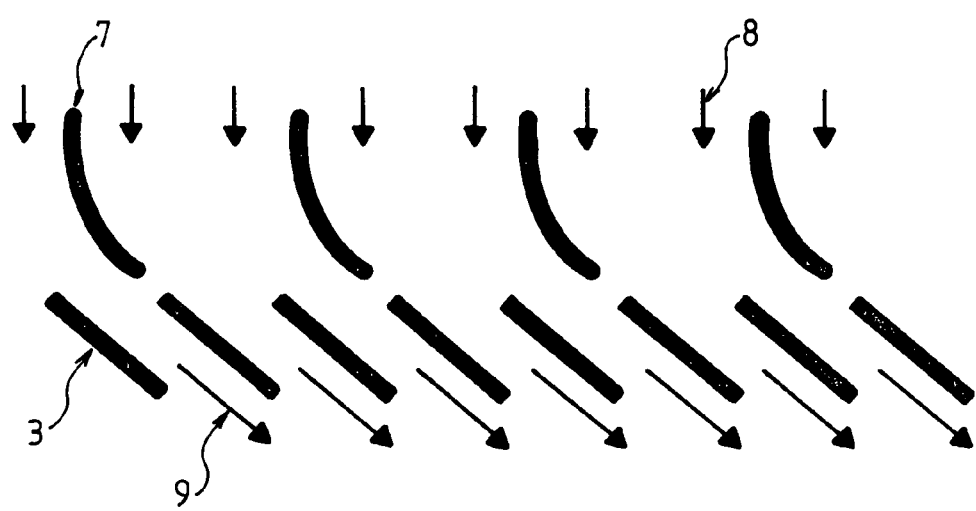
FIG. 2 is a schematic representation of the airflow circulation using a deflector.

FIG. 2 shows schematically the positioning of an airflow deflector at the air outlet fitted with a device according to the invention.

The vibrating fins 3 and the air deflector 7 positioned upstream are shown. This deflector 7 is oriented so as to direct the airflow in the direction required by the operator. It is independent of the mobile parts of the shutter 1 but may be integral with the fixed parts.

The natural airflow 8 upstream of the deflector and the exiting reoriented airflow 9 downstream of the shutter are shown by the arrows.

This diagram clearly shows that before reaching the fins 3, the exiting airflow 9 is already oriented in the required direction, which the fins could only do imperfectly. This reorientation of the airflow allows it to be moved away from any solid elements (walls and floor), thereby protecting the infrared invisibility of the vehicle. This configuration thus allows the heat signature of the vehicle thus equipped to be considerably reduced.

The deflector is independent of the shutter but may be fastened without any major modification onto the same support. It may be made of various forms such as a grid or strips.

Other embodiments and variants are naturally possible without departing from the scope of the invention.

What is claimed is:

1. A device for preventing the formation of solid matter on projections of a gas outlet on a vehicle, said device comprising a plurality of vanes located adjacent one another, said plurality of vanes being alternatively fastened onto a support with different types of fastening, at least two adjacent vanes having at least two different vibration characteristics.

2. A device according to claim 1, wherein one of said plurality of vanes is connected to a support by a number N of fastenings and the other one of said plurality of vanes is connected to said support by a number N+/−1 fastenings.

3. A device according to claim 2, wherein said support for said plurality of vanes comprises an assembly of bars that are substantially perpendicular to the axial direction of said plurality of vanes.

4. A device according to claim 2, further comprising a plurality of abutments limiting the possibility of transverse displacement to eliminate impacts between said plurality of vanes and said support, thereby eliminating shocks.

5. A device according to claim 4, wherein said abutments are arranged on said plurality of vanes or on said support.

6. A device according to claim 5, wherein said abutments comprise partly or totally a non-metallic material.

7. A device according to claim 1, wherein said plurality of vanes is vibratable by shocks or shaking to which said outlet is subjected.

8. A device according to claim 1, wherein the vibration of said plurality of vanes is vibratable by a line of electromagnets placed near the vibration nodes of said plurality of vanes, whose frequency is adapted to said vanes and whose phase shifting causes said vanes to vibrate in opposition or in quadrature.

9. A device according to claim 2, wherein said support for said plurality of vanes is of greater rigidity than said plurality of vanes.

10. A device according to claim 1, wherein said plurality of vanes are of a thickness giving a rigidity such that their vibrations are not noticeably damped in the presence of projections.

11. A device according to claim 1, additionally comprising upstream airflow deflectors fitted with a curved part to orient gas flow towards each of said plurality of vanes.

12. A device for preventing the formation of solid matter on projections of a gas outlet on a vehicle, said device comprising a plurality of vanes located adjacent one another, said plurality of vanes being fastened to a support with every other one of said plurality of vanes being fastened differently from the remaining alternate vanes, at least two adjacent vanes having at least two different vibration characteristics.

13. A device according to claim 12, wherein one of said plurality of vanes is connected to a support by a number N of fastenings and the other one of said plurality of vanes is connected to said support by a number N+/−1 fastenings.

14. A device according to claim 13, wherein said support for said plurality of vanes comprises an assembly of bars that are substantially perpendicular to the axial direction of said plurality of vanes.

15. A device according to claim 13, further comprising a plurality of abutments limiting the possibility of transverse displacement to eliminate impacts between said plurality of vanes and said support, thereby eliminating shocks.

16. A device according to claim 15, wherein said abutments are arranged on said plurality of vanes or on said support.

17. A device according to claim 16, wherein said abutments comprise partly or totally a non-metallic material.

18. A device according to claim 12, wherein said plurality of vanes is vibratable by shocks or shaking to which said outlet is subjected.

19. A device according to claim 12, wherein the vibration of said plurality of vanes is vibratable by a line of electromagnets placed near the vibration nodes of said plurality of vanes, whose frequency is adapted to said vanes and whose phase shifting causes said vanes to vibrate in opposition or in quadrature.

20. A device according to claim 13, wherein said support for said plurality of vanes is of greater rigidity than said plurality of vanes.

21. A device according to claim 12, wherein said plurality of vanes are of a thickness giving a rigidity such that their vibrations are not noticeably damped in the presence of projections.

22. A device according to claim 12, additionally comprising upstream airflow deflectors fitted with a curved part to orient gas flow towards each of said plurality of vanes.

* * * * *